Aug. 6, 1946.    D. C. MAYTAG    2,405,510
ELECTRIC WELDING APPARATUS
Filed April 3, 1943    6 Sheets-Sheet 1

INVENTOR.
Daniel E. Maytag
BY Parkinson & Lane
Attys

Witness:
Chs. R. Loursh.

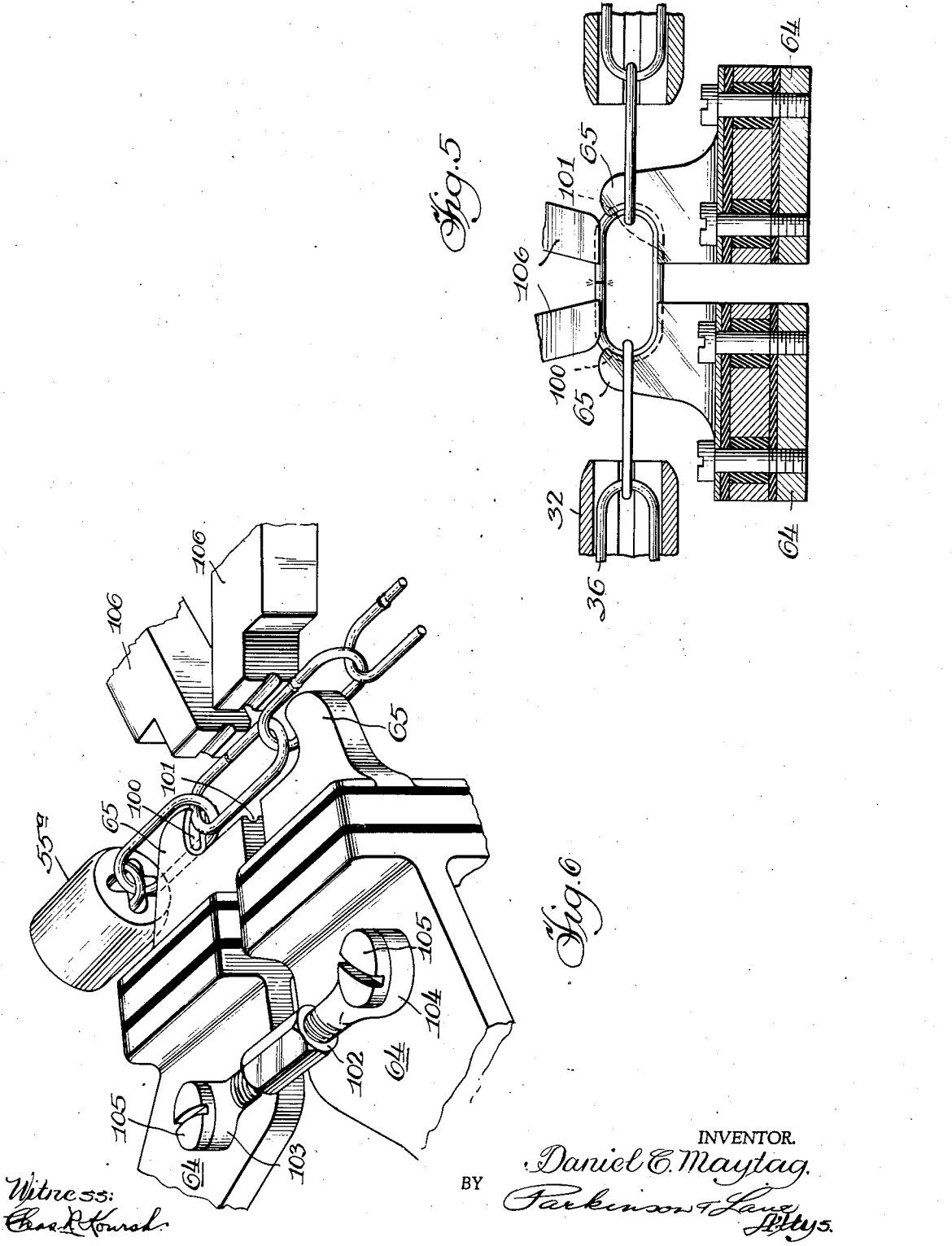

Aug. 6, 1946. D. C. MAYTAG 2,405,510
ELECTRIC WELDING APPARATUS
Filed April 3, 1943 6 Sheets-Sheet 6
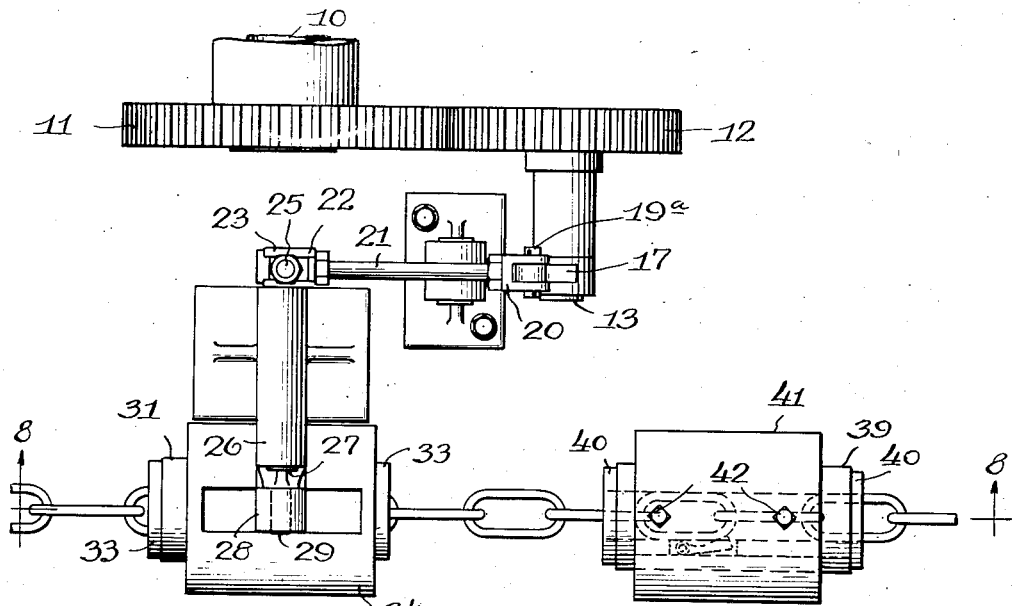
Fig. 7
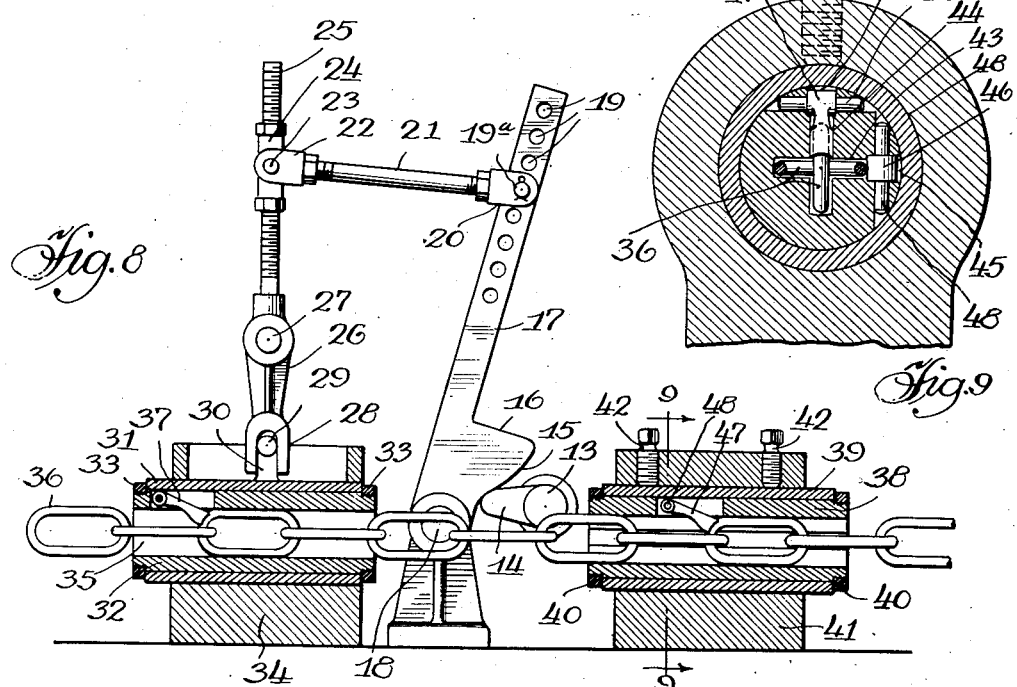
Fig. 8
Fig. 9
INVENTOR.
Daniel C. Maytag
BY Parkinson & Lane
Attys.

Patented Aug. 6, 1946

2,405,510

UNITED STATES PATENT OFFICE 2,405,510

ELECTRIC WELDING APPARATUS

Daniel C. Maytag, Laurel, Iowa

Application April 3, 1943, Serial No. 481,714

6 Claims. (Cl. 219—5)

The present invention relates to an electric welding apparatus and especially to such an apparatus or machine for welding the successive links of a chain.

Among the objects of the present invention is to provide a novel electric welding apparatus in which all of the links of a chain are successively welded in a single, continuous operation. In prior machines for welding chain links, such machines weld but alternate links, thus requiring that the chain be passed a second time through the apparatus in order that all of the links be welded. In the present novel construction, the invention comprehends mechanism for rotating successive links through an angle of approximately 90° so that each link is positioned in its predetermined location and relation with respect to the welding electrodes for most effective welding.

The invention further comprehends a novel means and mechanism for feeding the individual links through the welding mechanism in synchronism or timed relation with the welding step so that a continuous length of chain may be welded in a single, continuous operation.

A further object of this invention is to provide mechanism for controlling the amount of pressure or squeeze applied to the opposite ends of each link and eliminating all possibility of jackknifing and misalignment of the adjacent ends of the link to be welded, thus preventing the formation of a thickened portion at the weld.

Another object of the present invention is the provision of a novel adjustable toggle arrangement for gripping the opposite ends of the individual links. This toggle mechanism is so constructed and arranged that it may be quickly adjusted for different size chains whereby a single machine may accommodate chains having links varying through a wide range of dimensions.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 5 is a view in horizontal cross section taken on the irregular line 5—5 of Figure 4.

Figure 6 is a view in perspective showing the position of the chain, electrodes and clamping jaws just prior to the welding operation.

Figure 7 is a fragmentary enlarged plan view of the link actuating mechanism.

Figure 8 is a view in vertical cross section taken in a plane represented by the line 8—8 of Figure 7.

Figure 9 is a view in vertical cross section taken in a plane represented by the line 9—9 of Figure 8.

Figure 2:
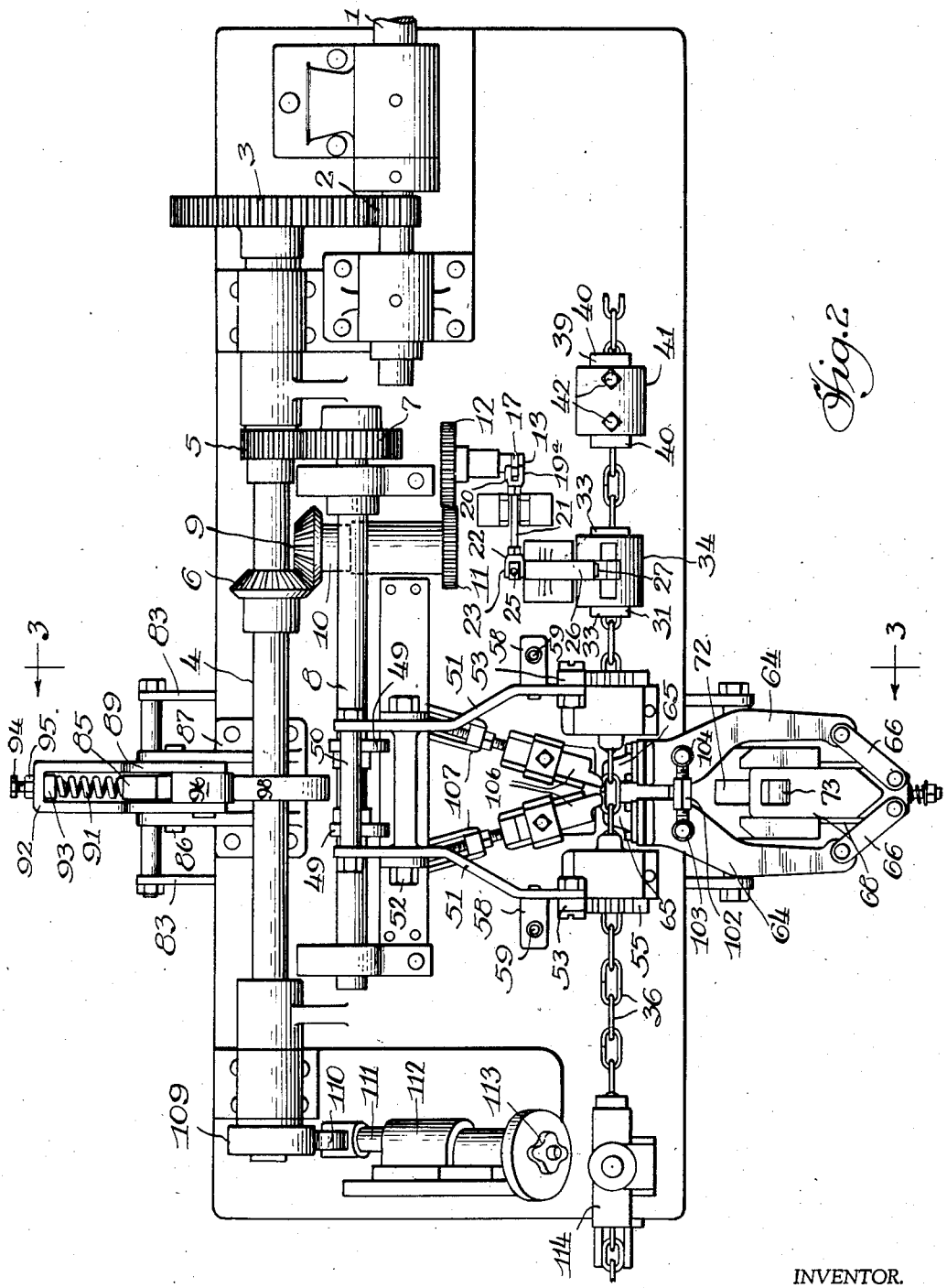
Figure 2 is a top plan view of the welding machine.
Figure 3:
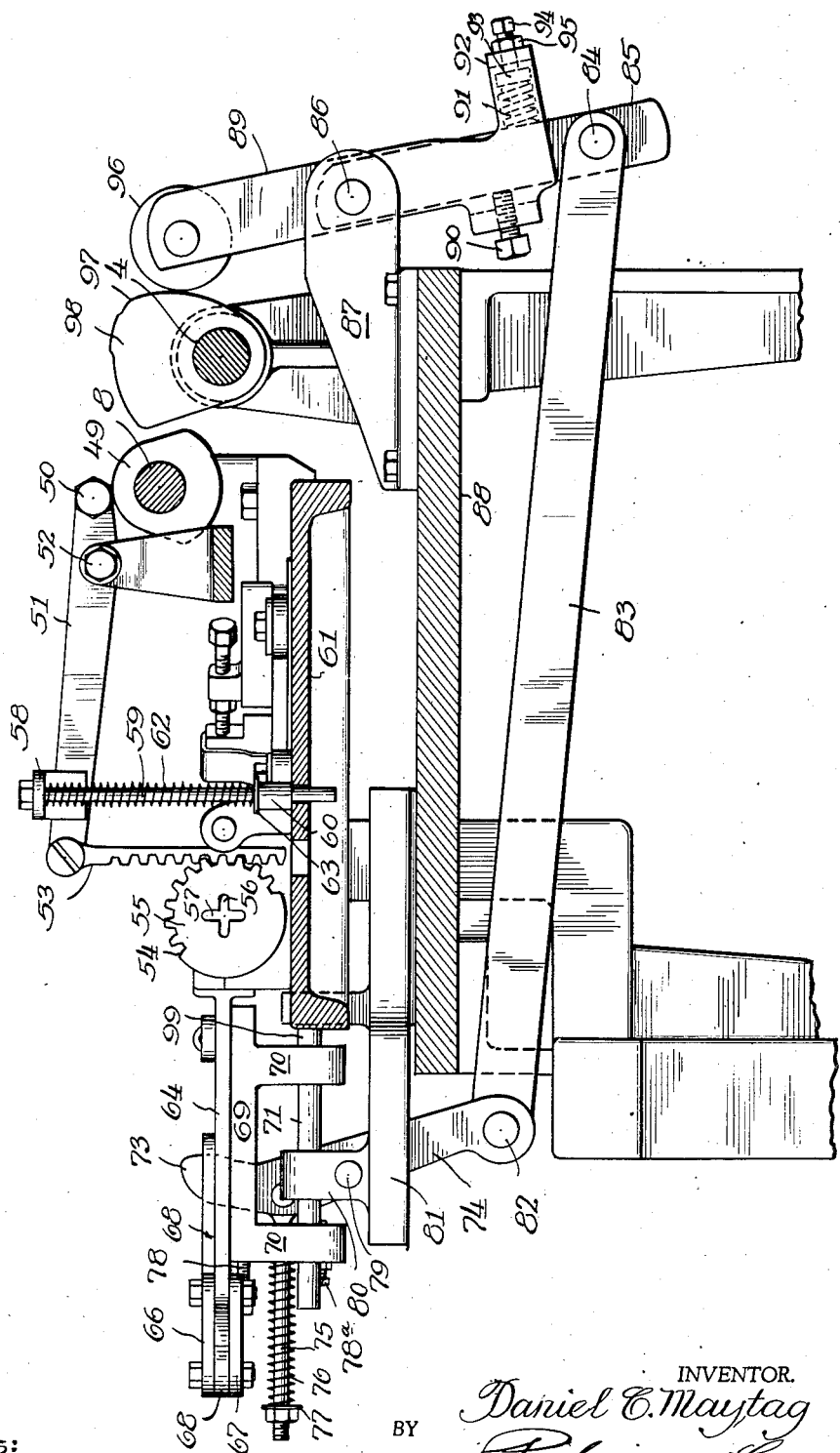
Figure 3 is a view in vertical cross section taken in a plane represented by the line 3—3 of Figure 2.
Figure 4:
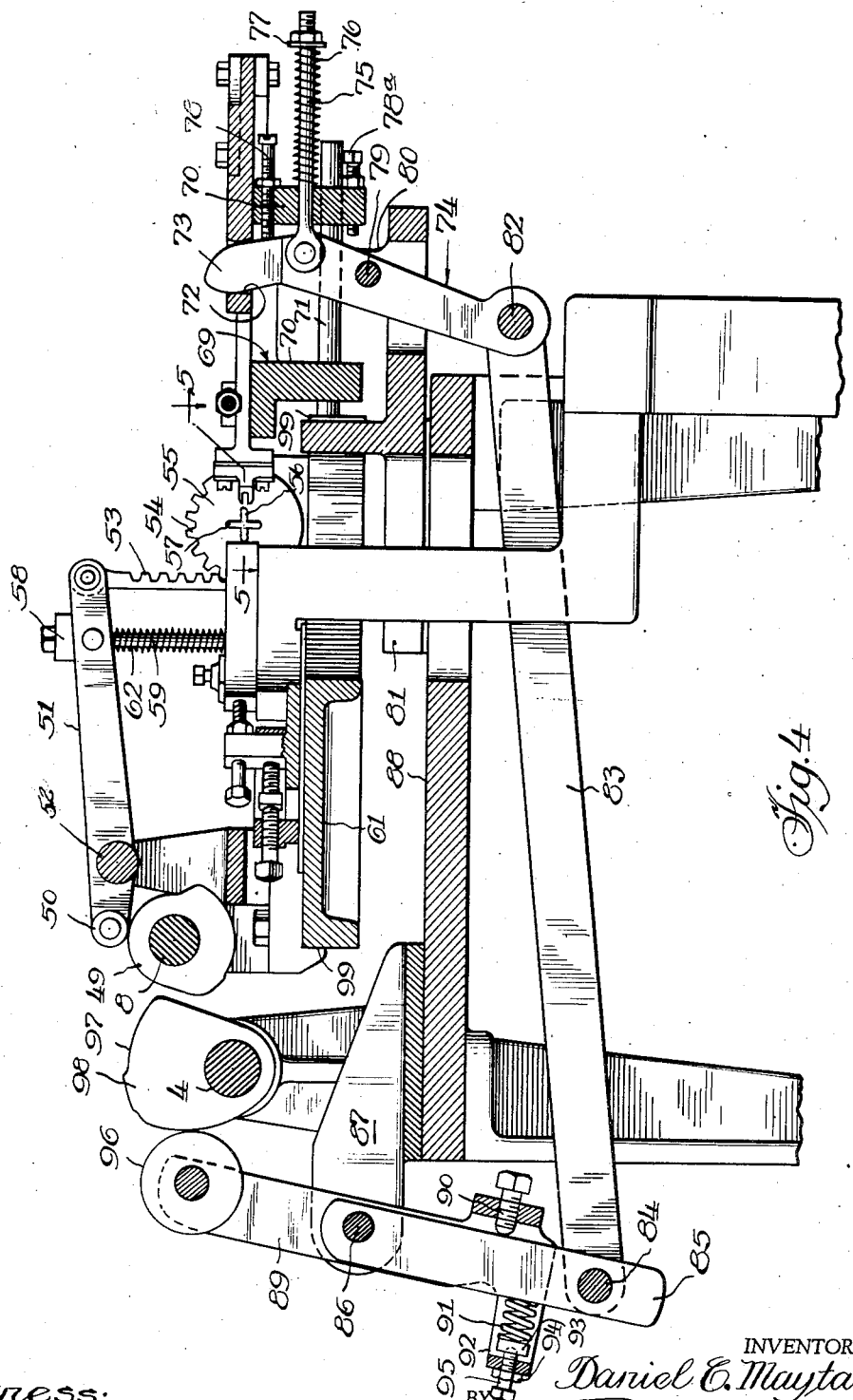
Figure 4 is a view in vertical cross section taken in a plane represented by the line 4—4 of Figure 1.

Referring more particularly to the disclosure in the drawings, the novel illustrative embodiment therein shown comprises an electric welding apparatus for welding successive links of a chain in a single, continuous operation. As shown in Figure 2, power is supplied to the mechanism from any suitable source through the drive shaft 1, gears or pinions 2 and 3, the latter being keyed to and driving the shaft 4 journalled within the spaced bearings. Suitably keyed or pinned to the shaft 4 in spaced relation is a pinion or gear 5 and a bevel gear 6. The pinion 5 meshes with and drives a pinion 7 pinned or keyed to the driven shaft 8 also suitably journalled within its spaced bearings. The bevel gear 6 meshes with and drives a bevel gear 9 keyed to a shaft 10 which in turn drives a gear or pinion 11 meshing with a gear or pinion 12.

The gear or pinion 12 is pinned or keyed upon one end of a stub shaft 13 carrying upon its other end a projecting arm 14. This projecting arm 14 is adapted to engage the cam face 15 formed on a projection 16 of a crank or lever arm 17 pivotally mounted at its lower end upon a stub shaft 18. Throughout a considerable portion of its length the crank or lever arm 17 is provided with openings 19 for receiving a pin 19ª secured to the bifurcated member 20 threaded to an adjustable connecting rod 21. The other end of this rod is also provided with a bifurcated member 22 connected by means of a pin 23 to a threaded sleeve 24 adjustably mounted upon a threaded rod 25. The lower end of this rod 25 is connected to a toggle arm 26 pivotally mounted at 27 and bifurcated at its lower end 28 for receiving a pin 29 on an upstanding lug 30 secured to an encompassing sleeve 31 of a block 32. This sleeve and block are joined together by means of lock nuts 33, 33 and are adapted to slide or move as a unit laterally within the support 34.

The block 32 is provided with a longitudinally disposed opening 35 for the passage of the connected links 36 of a chain after the welding operation. In order to prevent these links from being retracted but permitting their movement in the opposite direction, a pivotally mounted pawl 37 is shown having its end so contoured as to engage or abut one end of a link as it passes through the block. In order to engage an adjacent link, a similar pawl 37 is preferably placed approximately 90° from that shown in Figure 8.

Positioned adjacent to but rearwardly of the slidable block 32 is a stationary block 38 having an encompassing sleeve 39 with the block and sleeve secured together by lock nuts 40, 40. To hold this block fixed within its base 41, spaced set screws 42, 42 are provided which secure the sleeve 39 to the base 41. Within the block 38 are provided crossed slots 43 and 44 (see Fig. 9) disposed at right angles to each other for the reception and passage therethrough of successive links 36, one of which is disposed in a substantially horizontal plane and the adjacent one in a substantially vertical plane. Associated with each of these slots in an aligned recess 45 for the reception of the hub of each of a pair of pivotally mounted pawls 46 and 47, each being pivoted about a pin 48, and each adapted to engage or abut an end of alternate links 36 as they pass through the slots 43 and 44.

Mounted upon the shaft 8 are a pair of spaced cams 49, 49, each adapted to engage against a cross rod or sleeve 50 mounted at its opposite ends on spaced lever arms 51 each pivotally mounted at 52 intermediate its ends. At its opposite end each lever arm carries a vertically movable rack 53 having its teeth in meshing engagement with the teeth 54 formed on the outer circumference of a block 55 carrying a cylinder member 55ª. This block and its cylindrical member are provided with crossed recesses 56 and 57 for the reception of successive links 36, and by actuating the rack 53 and gear segment 54 in timed relation through the cam 49, each successive link is positioned in the same horizontal plane for the welding operation and the successive links of the chain are transported to the welding assembly in timed relation. In order that the rack be moved vertically and reciprocated in its proper sequence to oscillate the block 55 through an angle of approximately 90° and to maintain the cross rod or sleeve 50 in contact with the face of the cams 49, each arm 51 is provided with a bracket 58 carrying a depending pin or rod 59 retained by a nut at its upper end and adapted to pass through a collar 60 and opening in the base 61. A coil spring 62 surrounds this pin with one end abutting the under surface of the bracket 58 and the other end seating against the shoulder or washer 63 on the upper surface of the collar 60.

The opposite ends of each link 36 are engaged by a pair of clamping or gripping members 64 having jaws 65 so contoured as to receive these opposite ends of the links 36. Pivotally connected to these gripping members are pairs of upper and lower toggle arms 66 and 67 and a plate 68. Positioned below and carrying the members 64 is a shelf or support 69 having spaced depending lugs 70 slidable on a rod 71 and a centrally disposed slot or recess 72 through which projects the upper end 73 of an arm 74. Connected to this arm near its upper end is a pin or rod 75 projecting through one of the lugs 70 and carrying a spring 76 abutting at one end against the lug and at its other end against a washer and an adjustable nut 77 whereby the compression of the spring may be adjusted to vary the force on the plate 68. An upper adjustable screw 78 and a lower adjustable screw 78ª provide an adjustable abutment for the arm 74.

The arm 74 is pivotally mounted upon the stub shaft 79 carried at its opposite ends in upstanding lugs or projections 80 provided on the support 81. The lower end of the arm 74 is pivotally connected at 82 to the forward end of spaced connecting links 83, the latter being pivotally connected at 84 to adjacent the lower end of a rocker arm 85. This rocker arm is pivotally mounted at 86 upon a bifurcated bracket 87 secured upon the base or table 88. Also pivotally mounted at 86 is a U-shaped member or connecting arm 89 which is adjustably connected to the arm 85 by means of a set screw 90 and a coil spring 91 adjustably positioned within the channel-shaped end 92. This spring seats against a block 93 adjustable through a set screw 95 and lock nut 94.

At its upper end the U-shaped member or connecting arm 89 carries a roller 96 contacting or engaging against the contoured face 97 of a cam 98 mounted on the rotatable shaft 4. Thus, as the shaft 4 rotates, the cam face 97 moves the roller 96 and the arms 89 and 85 in such manner as to reciprocate the connecting bar or link 83 and the arm 74. As the upper end of this bar engages the plate 68, it moves this plate and the shelf or support 69 forwardly until the forward lug 70 engages the shoulder or abutment 99 on the support 61. At such time the toggle arrangement forces the outer ends of the arm 64 outwardly and the jaw-like ends 65 are cammed inwardly by the straightening of the toggle links 66 and 67 to engage the opposite ends of the links 36 when in a substantially horizontal plane, and squeeze these ends so as to force the contiguous open ends of the link into aligned and substantially abutting relation for the welding operation. These jaws 65 are each recessed at 100 and 101 to conformably receive the link therebetween as shown more clearly in Figures 5 and 6. When the link is in the position shown in Figure 5, welding is adapted to take place.

The length of the links 36 to be welded may be readily compensated for by an adjustable turnbuckle 102 having its opposite ends 103 and 104 secured by bolts or the like 105 to the gripping members 64.

The spaced electrodes 106 are suitably mounted upon the base or support 61 and adapted to be adjusted toward or away from the work by means of adjusting means 107. These electrodes may be energized in any suitable manner such as by means of the unit 108 (see Figure 1). In order to make and break the contact to the electrodes so that current is supplied only when a link 36 is in proper position and with the gripping members 64 and jaws 65 applying the necessary squeezing pressure to the opposite ends of the link as shown in Figure 5, a cam 109 is mounted upon the end of the shaft 4. This cam engages a roller 110 upon the end of a shaft 111 for making and breaking the contact in the electrical circuit. This making and breaking is accomplished within the housing 112 in any suitable manner, with adjustment between the contacts being accomplished by a hand-actuated nut 113 adapted to move one of the contacts away from or into closer relation with the other, the latter being preferably stationary. Suitable insulation is provided between the parts as shown in Figures 5 and 6 to prevent the current from being conducted from the electrodes to other parts of the welding apparatus.

Figure 1:
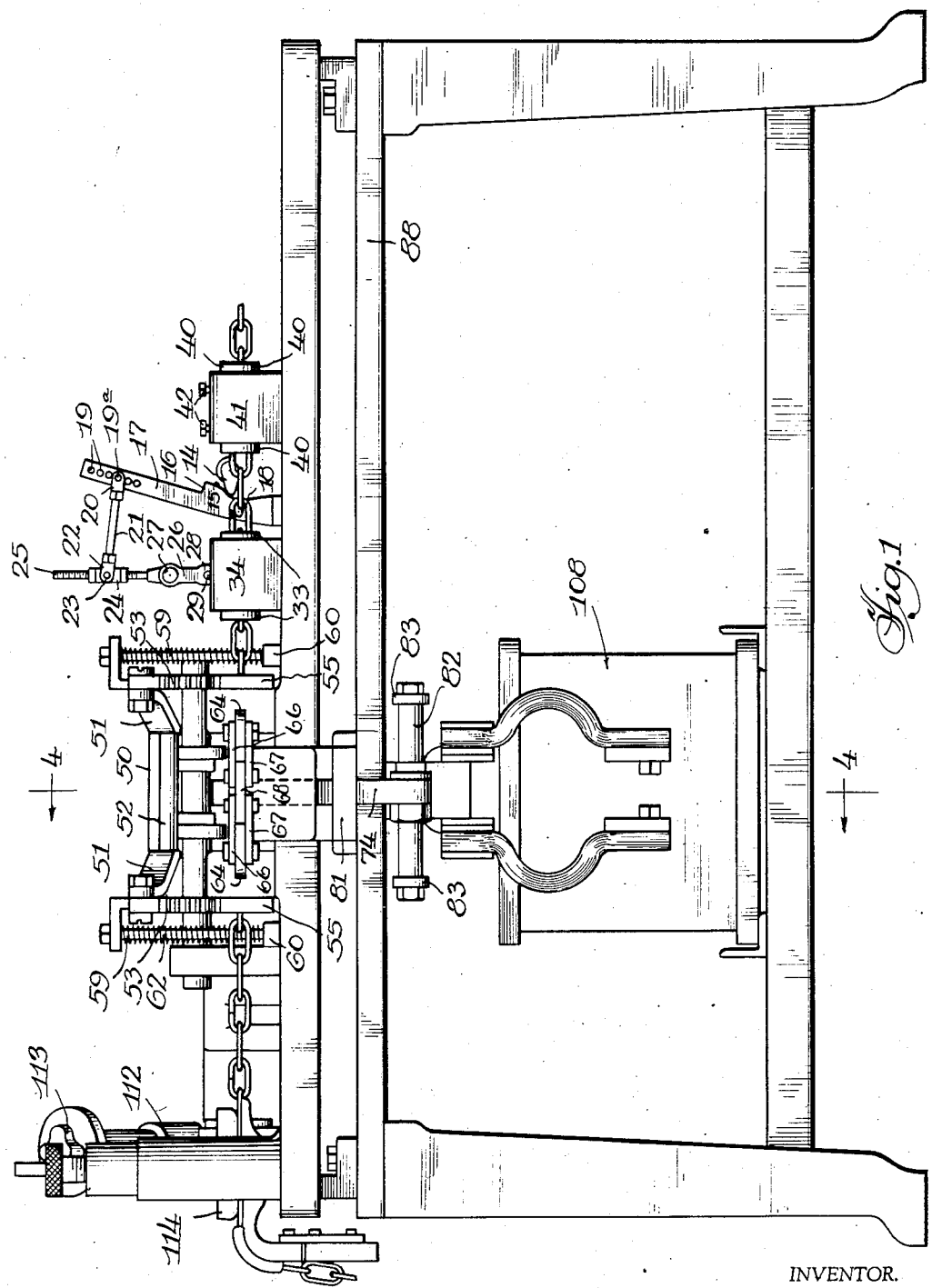
Figure 1 is a view in front elevation of the novel electric welding apparatus.

It will be appreciated that when the chain is fed into the welding mechanism through the block or guide 114 and the block 55 to the left of the mechanism shown in Figures 1 and 2, each link will be in a substantially horizontal plane for welding the successive links in a single, continuous operation. Also the component parts of the apparatus are so related and synchronized that the operation continues automatically.

Having thus disclosed the invention, I claim:

1. In an automatic welding apparatus for welding successive links of a chain in sequence and in a continuous operation, comprising a pair of stationary welding electrodes, means for feeding the chain to and from the electrodes in timed relation with the welding operation, a block and a cylinder carried thereby positioned at the opposite sides of the electrodes for receiving the successive links prior and subsequent to their presentation to the electrodes, each cylinder being provided with angularly arranged slots for conformably receiving successive links as the chain passes therethrough, teeth provided on each block, a reciprocating rack meshing with the teeth on each block and adapted to oscillate the blocks and cylinders in unison through an angle of approximately 90° to thereby present each successive link to the electrodes in the same plane and in proper position for welding, a cam rotatable in synchronism with the chain feeding means for actuating the racks, blocks and cylinders in timed relation, and a pair of gripping members each provided with a recessed jaw movable into and out of gripping relation with the opposite ends of each successive link as it is presented for the welding operation.

2. In an electrical welding apparatus for welding successive links of a chain, a pair of gripping members each provided with a recessed jaw at one end for gripping and retaining each link of the chain in position for welding and applying a predetermined and controlled pressure to the links during the welding operation and pivotally connected adjacent their other end, and an adjustable connection between the forward ends of the gripping members for adjusting said gripping members to accommodate links of varying dimensions.

3. In an electrical welding apparatus for welding the links of a chain, a pair of clamping members having spaced jaws at one end so contoured as to engage the opposite ends of a link, a system of toggle arms at the other end of the members for moving the jaws to grip the ends of the link with a predetermined pressure and prevent jackknifing of the contact ends to be welded, and an adjustable turnbuckle connecting the forward ends of the clamping members for adjusting these clamping members to accommodate links of differing sizes.

4. In an automatic welding apparatus for welding all of the links of a chain in a continuous operation, a pair of stationary welding electrodes, means for feeding and alternately rotating the adjacent links through a predetermined angle for presenting each successive link to said electrodes in substantially the same position for welding whereby the successive links are welded in a single, continuous operation, a pair of gripping arms each provided with a clamping jaw at one end so contoured as to embrace the opposite ends of each link and apply a squeezing pressure to move and retain the contact ends of each link in proper position for welding, and cam actuated toggle mechanism pivotally connected to the other end of the arms and synchronized with the feeding means for gripping and applying a predetermined pressure to the clamping jaws in timed relation with the energizing of the electrodes.

5. In an automatic welding apparatus for welding the links of a chain, a pair of stationary welding electrodes, mechanism for feeding the chain to the electrodes and through the apparatus and including a movable and a fixed block, an opening through each of the blocks through which the chain passes, cam actuated means for moving the movable block a link length, a pawl in the movable block for engaging a link and retaining the chain against retraction, and pawls in the stationary block for engaging successive links to permit their movement in but one direction.

6. In an automatic welding apparatus for welding the links of a chain, a pair of stationary welding electrodes, mechanism for feeding the chain to the electrodes and through the apparatus and including a movable member having an opening through which the chain passes, a pawl mounted in the member and for moving the chain in one direction and adapted to engage a link, means for moving the member the length of one link, means engaging and retaining the chain against retraction and means for adjusting the movement of said member to accommodate links of different lengths.

DANIEL C. MAYTAG.